United States Patent
Gayer et al.

(10) Patent No.: US 8,328,245 B2
(45) Date of Patent: Dec. 11, 2012

(54) CLAMP ADAPTER ASSEMBLY

(75) Inventors: Jason Gayer, Springfield, MO (US);
Charles P. McKee, Rogersville, MO (US); Carl Johnson, San Mateo, CA (US)

(73) Assignee: SRM, LLC, Springfield, MO (US)

( * ) Notice: Subject to any disclaimer, the term of this patent is extended or adjusted under 35 U.S.C. 154(b) by 220 days.

(21) Appl. No.: 12/722,658

(22) Filed: Mar. 12, 2010

(65) Prior Publication Data

US 2010/0229353 A1  Sep. 16, 2010

Related U.S. Application Data

(60) Provisional application No. 61/159,506, filed on Mar. 12, 2009.

(51) Int. Cl.
*F16L 23/00* (2006.01)

(52) U.S. Cl. ........ 285/415; 285/364; 285/368; 285/407; 285/412

(58) Field of Classification Search .................. 285/363, 285/364, 365, 366, 367, 368, 253, 405, 406, 285/407, 408, 409, 410, 411, 412, 413, 414, 285/415, 420; 248/544
See application file for complete search history.

(56) References Cited

U.S. PATENT DOCUMENTS

| | | | |
|---|---|---|---|
| 674,928 A * | 5/1901 | Mauran | ........................ 285/412 |
| 4,192,051 A | 3/1980 | Bergeron | |
| 6,026,521 A | 2/2000 | Atkins | |
| 6,523,866 B2 | 2/2003 | Lin | |
| 6,712,403 B1 * | 3/2004 | Dusevic | ........................ 285/368 |
| 7,004,470 B2 * | 2/2006 | Hystad | ........................... 277/317 |
| 7,114,752 B2 * | 10/2006 | Voelker | ........................... 285/302 |
| 7,134,695 B2 * | 11/2006 | Jewett et al. | ............... 285/141.1 |
| 2003/0122377 A1 | 7/2003 | Northrop et al. | |
| 2008/0001053 A1 | 1/2008 | Sandy | |

OTHER PUBLICATIONS

Cornelis J. Dekker, Walther J. Stikvoort, Improved design rules for pipe clamp connectors, International Journal of Pressure Vessels and Piping, Feb. 2004, pp. 141-157, vol. 81, No. 2, Elsevier Ltd.
SAE Handbook, 1994, vol. 2 Parts and Components, Society of Automotive Engineers, Inc., Warrendale, PA.

\* cited by examiner

*Primary Examiner* — James Hewitt
*Assistant Examiner* — Jay R Ripley
(74) *Attorney, Agent, or Firm* — Husch Blackwell LLP

(57) ABSTRACT

A clamp adapter assembly for connecting an instrument to a pressure vessel. The clamp adapter assembly allows an operator to convert a bolt connection base known in the art into a base suitable for utilizing a clamped connection similarly known in the art. The connection assembly includes a bottom plate, at least one fastener to fasten the bottom plate to a base, a top retaining plate, and a clamp. The peripheral portions of the bottom plate and top retaining plate may be beveled in order to be received within a tri-clamp. The top retaining plate may include two sections that overlappingly engage one another.

11 Claims, 7 Drawing Sheets

CLAMP ADAPTER ASSEMBLY

CROSS-REFERENCE TO RELATED APPLICATIONS

This nonprovisional application claims the benefit of Provisional Patent Application Ser. No. 61/159,506 filed Mar. 12, 2009, the entire disclosure of which is incorporated herein by reference.

BACKGROUND OF THE INVENTION

Pressure vessels are utilized in many industries for manufacturing products when maintaining specific temperatures and pressures is required. Industries using pressure vessels include but are not limited to pharmaceutical, chemical, food and beverage, medical, biotechnical, ethanol, dairy, water treatment, paper, cryogenic, and other industries requiring chemical or biological processing in a pressurized environment. The processes that require the use of pressure vessels often require devices or other instrumentation to measure and control operating conditions such as temperature, pressure, liquid level, and other parameters through various known instrumentation. Further, these industries may also require pressure vessels to have inlets, outlets, or ports to introduce or remove contents, obtain samples of the contents of the tank while maintaining a sterile or sealed environment, or perform other related actions. Split ring connections and tri-clamp connections have become standard universal connections in the pressure vessel industry and allow instrumentation, inlets, outlets, ports, sight glasses or other apparatuses to be connected to a pressure vessel.

Split ring connections, such as the NovAseptic® connector, and the ASEPCONNECT™ connector, are well known in the art and utilize a base welded to the pressure vessel and a split retaining ring. The instrumentation is secured in the base by the split retaining ring that, when tightened, engages the instrument's ferrule and compresses the ferrule and an elastomeric seal against a seat in the base thereby effectuating the connection. The compression required to create the seal and connection is created using four or more threaded fasteners or bolts that can be tightened to achieve a desired compressive force and resistance.

A large number of pressure vessels manufactured and in use today are outfitted with bases designed for utilizing split ring connections. However, these bolted split ring connections have several drawbacks. The first problem relates to their inability for allowing instrumentation to be quickly removed, exchanged or replaced. When an operator desires to remove, exchange or replace instrumentation held in place by a split ring connection, the operator locates the properly sized wrench and removes at least four buts or bolts. This can be a time consuming task. Second, in removing the nuts or bolts, occasionally the operator will inadvertently "strip" the threads within the base or the bolts extending from the base. When this occurs, the pressure vessel is deemed unusable until the base can be replaced. Replacing such a base in a pressure vessel may require the skill of an ASME-certified welder and can cost tens of thousands of dollars. Additionally, if the pressure vessel contains any product therein, the product is often times worth hundreds of thousands of dollars and may have to be discarded. A further shortcoming of the split ring connection occurs when an operator drops or misplaces the nuts or bolts, requiring yet additional time and effort to retrieve or replace the nuts or bolts.

Another shortcoming of bolted split ring connection relates to the thickness of the split ring itself. The two or more sections of the split ring act independently of one another. Split rings are often necessary because a solid retaining ring is not able to be installed over existing instrumentation. Because the split retaining ring sections act independently, the bending forces exerted on the sections' free ends require the ring to be of an increased thickness as compared to a solid (i.e., continuous and non-split) ring. The split ring's increased thickness sometimes presents clearance issues with the instrumentation held in place by the split ring.

Tri-clamp connections, such as the ASEPCO QUICKONNECT™, are well known in the art and utilize a tri-clamp or other known sanitary compression clamp to create a compression clamping force to join the apparatus or instrument to a dead leg. Tri-clamp connections generally use an elastomeric seal compressed or sandwiched between the two pieces being joined thereby creating a connection that is air tight and can withstand the required elevated pressure conditions. In the typical tri-clamp connection, two beveled flanges are received within and clamped together with a clamp. Many conventional tri-clamp connections known in the art include dead legs in order to extend the connection away from the surface of the vessel. The typical dead leg includes a spacer tube that is welded to the wall of a pressure vessel at one end and terminates in a beveled flange at the opposite free end. The beveled flange of the dead leg is positioned at a distance away from the vessel wall. The spacer tube of the dead leg introduces a recessed area in the interior surface of the vessel that is difficult to clean thoroughly. Because it is difficult to visually inspect and direct cleaning solutions into dead legs, contaminants can remain present even after the interior of the vessel is thought to be clean. This is especially worrisome in industries with strict sanitary requirements, or that have elevated legal liability if their products contain impurities, such as the pharmaceutical, food and beverage, or chemical industries.

Tri-clamp connections have become popular because they maintain the pressure capacity of the system, yet are easy to disassemble. The ability to easily disassemble the connection makes it easy to clean or replace the instrumentation, attachments, and clamps thereby facilitating the maintenance of a sterile environment. However, the dead legs often associated with such connections can cause cleanliness and sterility issues.

As mentioned above, a large number of pressure vessels manufactured and in use today are outfitted with bases designed for utilizing split ring connections, not tri-clamp connections. The task of replacing a base configured for a utilizing split ring connection with a base or dead leg configured for utilizing a tri-clamp connection is a substantial undertaking that may require the skill of an ASME-certified welder and can cost tens of thousands of dollars. Furthermore, the bases designed for utilizing split ring connections do not generally have the shortcomings of the dead legs configured for utilizing tri-clamp connections.

Therefore, a need exists for an assembly allowing an operator to transform a connection assembly having a base configured for a bolted split ring connection to a clamped connection assembly that uses tri-clamps or other sanitary clamps known in the art. Additionally, a need exists for an improved split retaining ring having a reduced thickness to decrease the total depth of the connection so as not to interfere with the instrumentation it is holding in place.

BRIEF SUMMARY OF THE INVENTION

The present invention is generally directed toward a clamp connection adapter assembly for a pressure vessel that allows an operator to convert a bolt or split ring connection base for use with a clamped connection. The connection assembly includes a bottom flange plate, at least one fastener to fasten the bottom flange plate to a base, a top retaining plate, and a clamp.

The bottom flange plate is configured such that it has an area larger than the area of the top of the bolt or split ring connection base. Further, the bottom flange plate is configured to be coupled to the bolt connection base using a threaded fastener that engages existing threaded bores in the bolt connection base. The bottom flange plate is also configured to allow an apparatus or instrument to nest in a housing within the bolt connection base. The top retaining plate is generally complimentary to the bottom flange plate and a portion of the top retaining plate is received into the housing in the bolt connection base. In one embodiment, the top retaining plate includes two sections that overlappingly engage. The clamp engages a portion of top retaining plate thereby compressing a ferrule of the instrument against the base in order to effectuate the connection of an instrument to the base. Embodiments of the clamp connection adapter assembly of the present invention may result in a connection of an instrument to a pressure vessel that meets the required strength specifications for pressure vessel connections.

BRIEF DESCRIPTION OF THE SEVERAL VIEWS OF THE DRAWING

The accompanying drawing forms a part of the specification and is to be read in conjunction therewith, in which like reference numerals are employed to indicate like or similar parts in the various views, and wherein.

DETAILED DESCRIPTION OF THE INVENTION

The following detailed description of the invention references the accompanying drawing figures that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the present invention. The present invention is defined by the appended claims and the description is, therefore, not to be taken in a limiting sense and shall not limit the scope of equivalents to which such claims are entitled.

Figure 1:
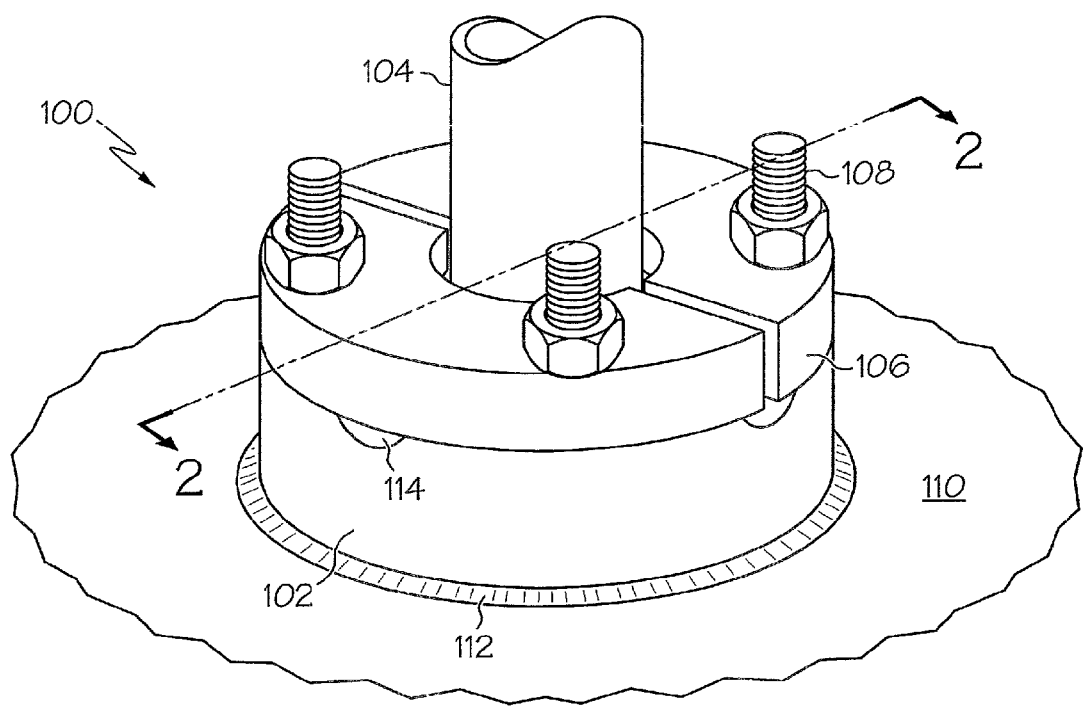
FIG. 1 is a top perspective view of a prior art bolted split ring connection assembly on a pressure vessel.

Turning now to the drawing figures, FIG. 1 shows an embodiment of a prior art bolted connection assembly 100 that includes a bolt connection base 102, a device or instrument 104, a bolted retaining ring 106, and threaded fasteners 108. As illustrated in FIG. 1, retaining ring 106 is split into two independent sections. These independent sections of split retaining ring 106 in the prior art must be thicker than a continuous (i.e., non-split) ring in order resist the forces exerted on the connection assembly 100. Each split retaining ring 106 section is coupled to base 102 by two threaded fasteners 108 that apply the sufficient compressive clamping force to effectuate a seal and secure the connection.

In the embodiment shown, bolt connection base 102 is generally coupled to the pressure vessel wall 110 by weld 112. Weld 112 effectively seals an opening in the pressure vessel wall 110 made at a designated location and corresponding to the size of the required bolt connection base 102 to connect a known size of instrument 104 to the pressure vessel. Further, bolt connection base 102 may also include a groove 114 that allows any moisture present on the top of the connection to drain off. Device or instrument 104 can be any apparatus or instrument now known or hereafter developed for being connected to a pressure vessel including, but not limited to a sensor, temperature or pressure gauge, thermowell, thermo-coupler, pressure switch, pump, reducer, fitting, valve, pipe, Ingold®-type adapter, sampling system, cleaning device and any other apparatus or instrumentation suitable for connection with a pressure vessel. It should be understood that for demonstration purposes, instrument 104 as shown in the figures merely represents an actual instrument that would be used in industry and that the actual instrument or device may be of a structure and form different from that depicted in the drawings. It should also be understood that while the vessel 108 may be described as being a pressure vessel, the present invention, including the retaining ring 104, is suitable for use with non-pressure bearing vessels as well.

Figure 2:
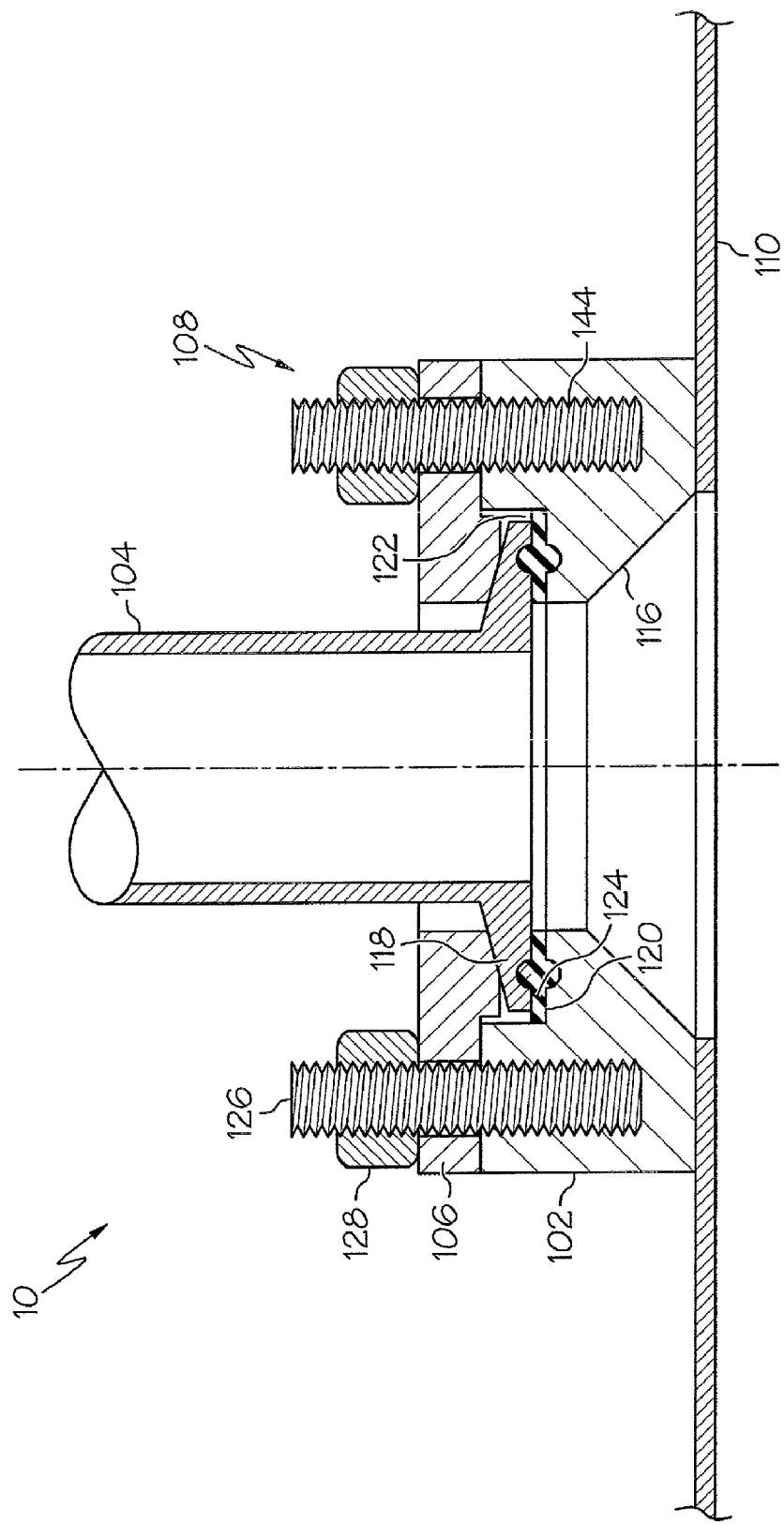
FIG. 2 is a cross sectional view of the assembled prior art bolted split ring connection assembly in FIG. 1 taken along the line 2-2.

Turning now to FIG. 2, instrument 104 includes a ferrule 118 that is configured to be generally received within an instrument housing 122 of bolt connection base 102. Ferrule 118 can be any standard or custom size known in the art, with common sizes of ferrule 118 having a diameter ranging from about one to about twelve (1-12) inches. It will be understood, however, that the present invention may be adapted for use with instruments 104 having ferrules 118 smaller than one (1) inch in diameter and larger than twelve (12) inches in diameter. As shown, a seal 124 is sandwiched between instrument ferrule 118 and seat 120. Ferrule 118 and instrument housing 122 may be circular as shown. However, ferrule 118 and instrument housing 122 shall not be limited by the shape of these elements. Therefore, it will be appreciated by one skilled in the art that ferrule 118 and housing 122 of present invention may be any suitable shape including, but not limited to, a circle, oval, square, rectangle, triangle, pentagon, hexagon, octagon and the like.

Bolt connection base 102 may also include a tapered inner wall 116 wherein the opening increases in size from seat 120 to vessel wall 110. Tapered wall 116 makes the connection easier to clean from the inside of the tank and improves the ability to maintain a sanitary environment. As shown, one embodiment of a prior art connection assembly includes a bolted retaining ring 106 being secured with threaded fastener 108 having a threaded rod 126 received by threaded bore 144 of bolt connection base 102, and a nut 128 that is tightened against bolted retaining ring 106 to compress instrument ferrule 118 and seal 124 against seat 120. The compression of ferrule 118 and seal 124 against seat 120 of bolted connection base 102 in prior connection assembly 100 generally results in an air-tight and pressure resistant connection of the instrument 104 to a pressure vessel.

Figure 3:
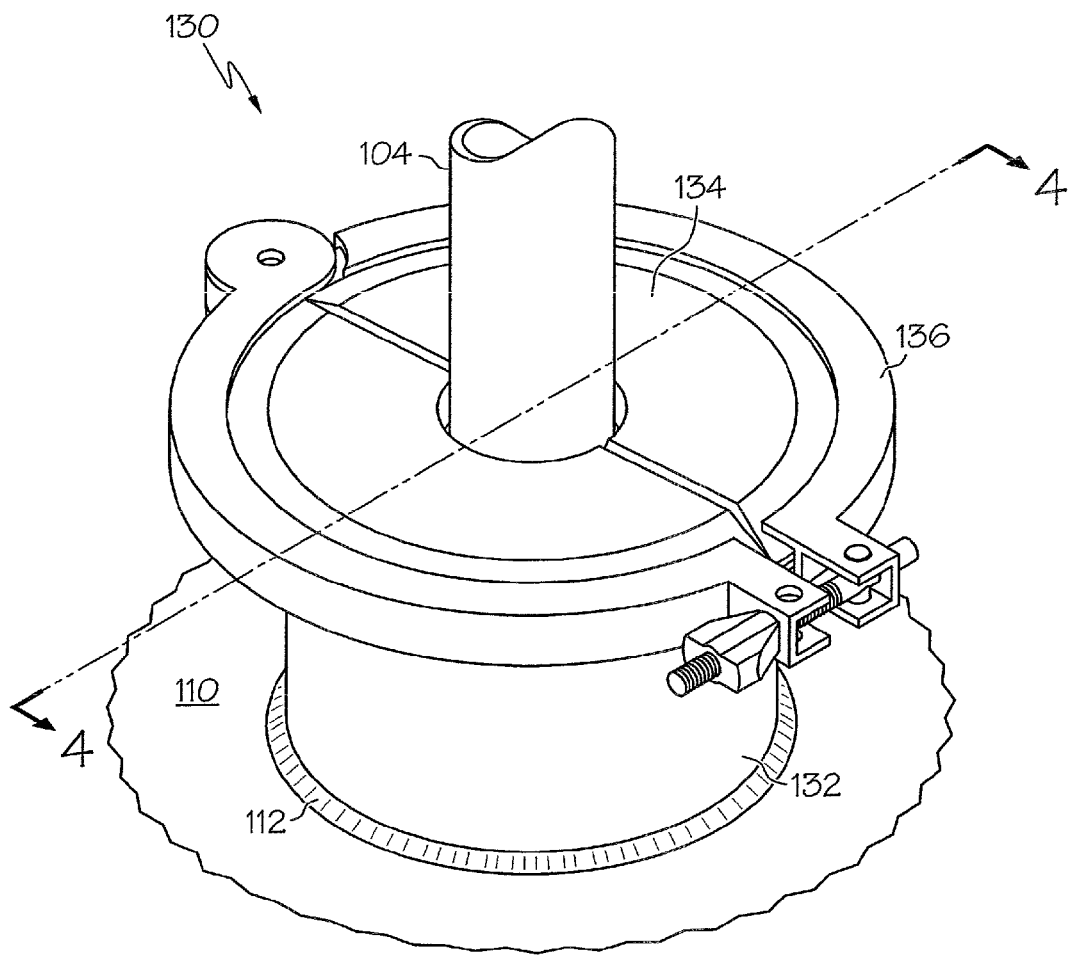
FIG. 3 is a top perspective view of a prior art tri-clamp connection assembly on a pressure vessel.

FIG. 3 illustrates an embodiment of a prior art tri-connection assembly 130 having a clamp connection base or spacer tube 132, an instrument 104, a split retaining ring 134, and a clamp 136. As illustrated in FIG. 3, retaining ring 134 is split into two independent sections. As described above, these independent sections of split retaining ring 134 in the prior art must be thicker than a continuous (i.e., non-split) ring in order resist the forces exerted on the connection assembly 100. As shown, clamp connection base 132 is welded to a pressure vessel wall 110.

Figure 4:
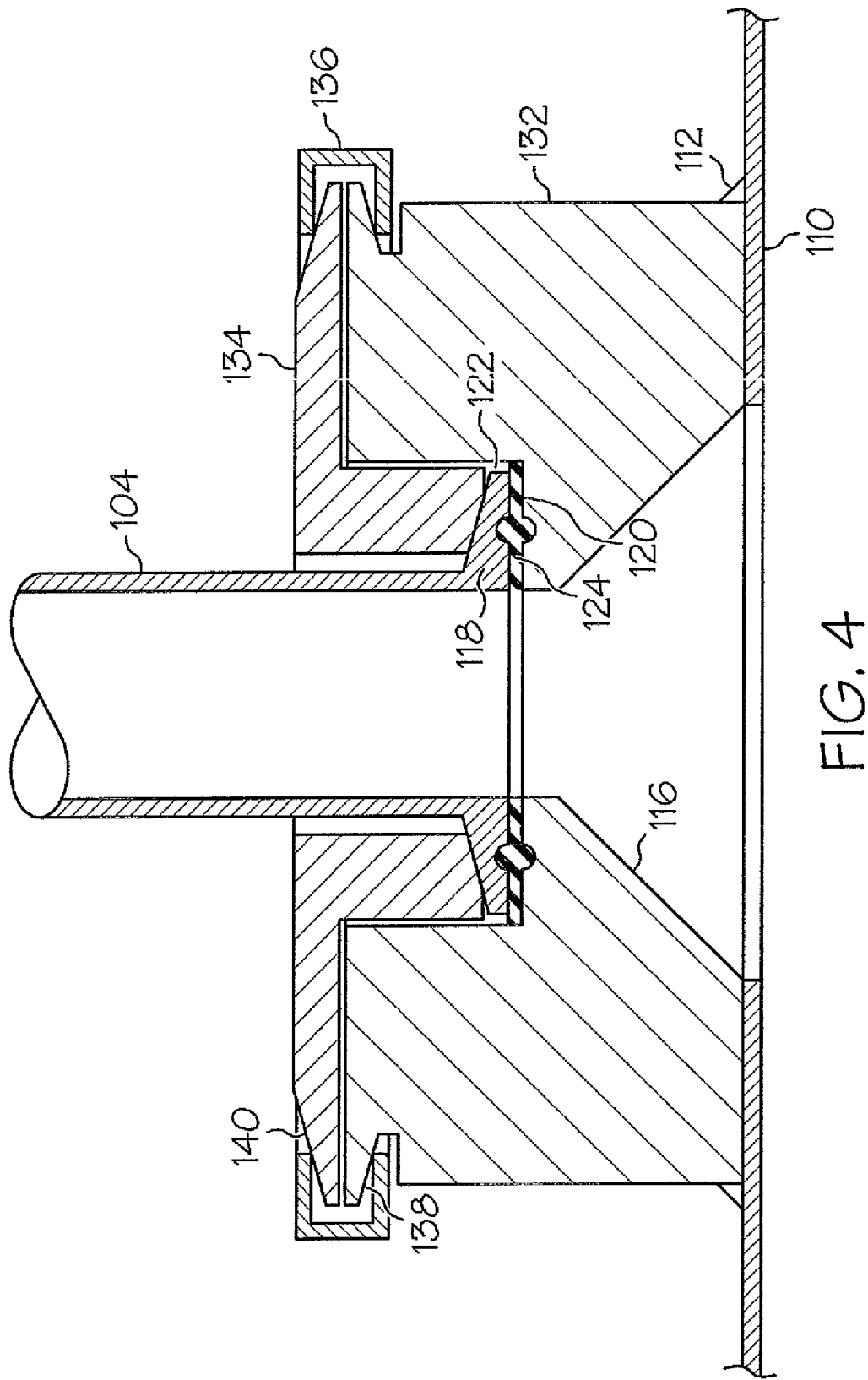
FIG. 4 is a cross sectional view of the assembled prior art tri-clamp connection assembly in FIG. 3 taken along the line 4-4.

Turning now to FIG. 4, the prior art clamp connection base 132 may include tapered inner wall 116 as described above. Further, instrument 104 includes a ferrule 118 that is configured to be generally received within an instrument housing 122 of clamp connection base 132. As shown, seal 124 is sandwiched between instrument ferrule 118 and seat 120. Each clamped retaining ring 134 is coupled to clamp connection base 132 by clamp 136. Clamp 136 provides sufficient compressive clamping force to effectuate a seal and secure the connection. Clamp connection base 132 differs from bolt connection base 102 in that clamp connection base 132 includes a beveled flange 138. Similarly, clamped retaining ring 134 differs from bolted retaining ring 106 as the outer portion of the top surface of clamped retaining ring 134 includes bevel 140. Clamp 136 engages beveled flange 138 and bevel 140 of clamp retaining ring 134 as shown. Clamp 136 is tightened thereby translating inward relative to the two beveled surfaces and effectively wedging retaining ring 134 toward clamp connection base 132. Retaining ring 134 engages instrument ferrule 118 which presses seal 124 against seat 120. The compression of ferrule 118 and seal 124 against seat 120 in housing 122 in prior art clamped connection assembly 130 generally results in an air tight pressure resistant connection of the instrument 104 to a pressure vessel.

Noting the differences between the bolted connection assembly and the clamped connectors in the prior art, it is evident that an operator must commit to a certain connector at time these connectors are initially welded onto on the pressure vessel during the pressure vessel's manufacturing process. Once bolt connection base 102 or clamp connection base 132 is coupled to the pressure vessel, it is an extremely involved process to change connection types. The clamp connection adapter assembly of the present invention generally facilitates an operator in adapting a bolt connection base 102 into a clamped connection and thereby obtaining the benefits of clamp connection assembly 130.

Figure 5:
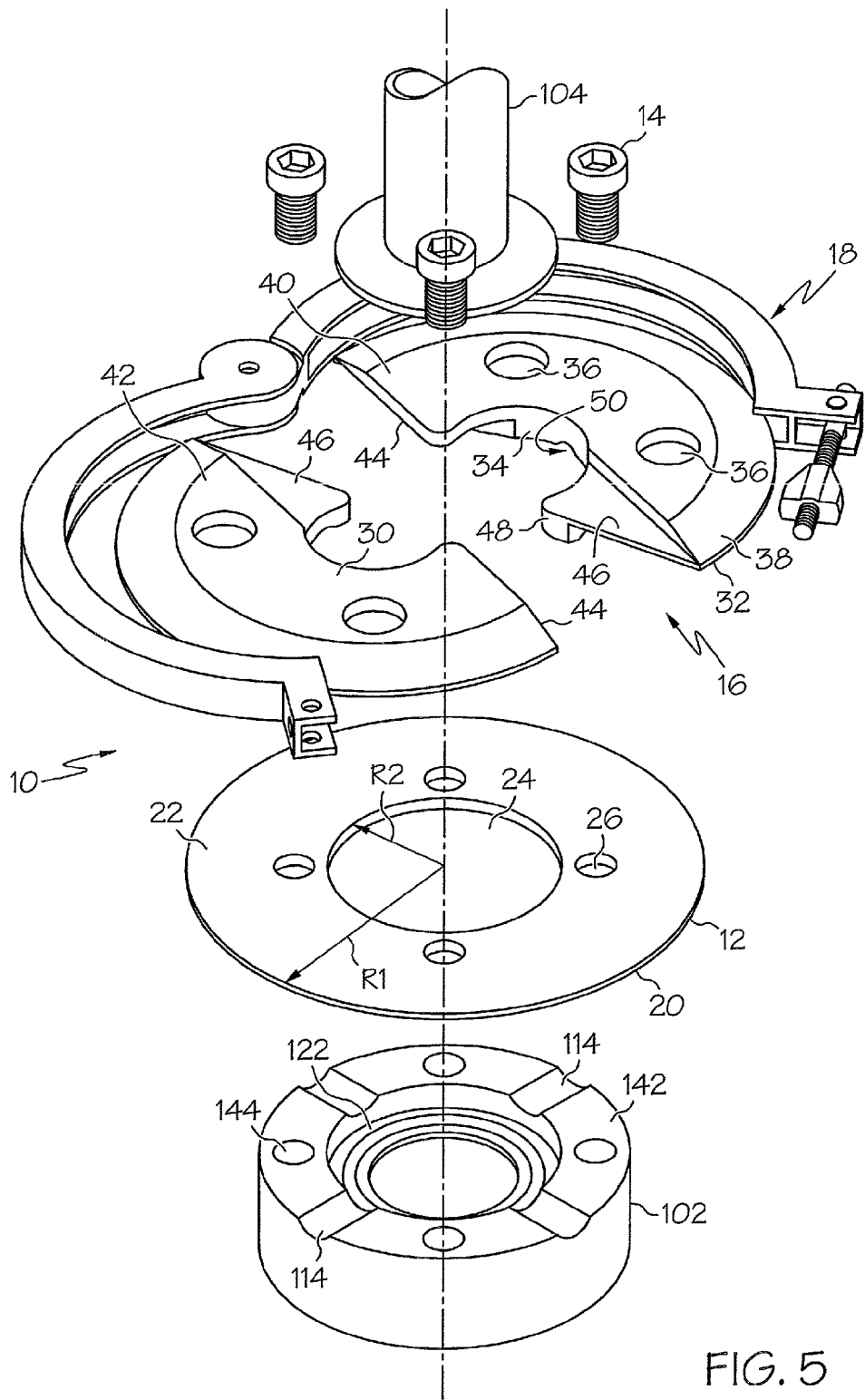
FIG. 5 is an exploded view of the clamp connection adapter assembly in accordance with one embodiment of the present invention.

FIG. 5 illustrates an embodiment of the clamp connection adapter assembly 10 of the present invention. FIG. 5 is an exploded view showing connection adapter assembly 10 adapting the bolt connection base 102 into a clamped connection to secure instrumentation 104 to a pressure vessel. Clamp connection adapter assembly 10 of the present invention includes a lower or bottom flange plate 12, a plurality of fasteners 14, an upper or top retaining plate 16, and a clamp 18. The embodiment of the present invention shown includes bottom flange plate 12, top retaining plate 16, and clamp 18 all having a circular geometry. However, it will be appreciated by a person of skill in the art that the bolt connection base 102, bottom flange plate 12, top retaining plate 16, and clamp 18 are not limited to a circular shape and embodiments of the present invention may be of any suitable shape including, but not limited to, square, rectangular, oval, triangular, pentagonal, hexagonal, octagonal and the like.

As shown in FIG. 5, bottom flange plate 12 includes a bottom side 20, a top side 22, aperture 24, and a plurality of bolt holes 26. As illustrated, the bottom flange plate 12 has an outer radius R1 that generally defines an area of bottom flange plate 12. Generally, the area of bottom flange plate 12 is greater than the area of a top 142 of bolt connection base 102. Further, bottom flange plate has a radius R2 that generally defines an aperture 24. Radius R2 and aperture 24 are configured to allow instrument 104 to be received within housing 122 of bolt connection base 102 as described above. Aperture 24 may be configured to correspond to a defined dimension of instrument 104 or other standard instrumentation dimensions known in the art in the ranges describe above. Aperture 24 is shown as having a circular geometry. However, it will be appreciated by a person of skill in the art that aperture 24 is not limited to a circular shape and may be of any suitable shape including, but not limited to, square, rectangular, oval, triangular, pentagonal, hexagonal, octagonal and the like. Further, bolt holes 26 of bottom flange plate 12 are configured to match the known pattern of the threaded bores 144 in prior art bolt connection base 102 as shown in FIG. 5. A person of skill in the art will appreciate that any number and size of bolt holes 26 are within the scope of the present invention as the number and size of bolt holes 26 will vary upon the number and size of threaded fasteners 108 in bolt connection base 102.

As shown in FIG. 5, top retaining plate 16 includes a top face 30, a bottom face 32, an inside face 34, and at least one aperture 36. The top face 30 includes a beveled perimeter edge 38. In one embodiment of the present invention, top retaining plate 16 is split and includes a first top plate section 40 and a second top plate section 42. It will be appreciated by one skilled in the art that first top plate section 40 and second top plate section 42 may be identical to one another thereby increasing the manufacturing efficiency. In other words, two identically manufactured sections 40 and 42 may be brought together to form the ring 16.

In the embodiment illustrated in FIG. 5, both top plate sections 40 and 42 include one overlap end 44 and one under-lap end 46. The overlap end 44 of first top plate section 40 will overlappingly engage under-lap end 46 of second top plate section 42. The overlap end 44 of second top plate section 42 overlappingly engages under-lap end 46 of first top plate section 40. In another embodiment (not shown), both ends of first top plate section 40 are configured as overlap ends 44 and both ends of second top plate section 42 are configured as under-lap ends 46. Other embodiments may include a top retaining plate 16 having more than two sections that overlappingly engage one another.

As illustrated, top retaining plate 16 includes an annular rib 48 proximate to inside face 34 of top retaining plate 16 as shown. One embodiment of annular rib 48 may include at least one groove 50 as depicted in FIG. 5. Groove 50 is generally configured transverse to said annular rib 48 in a manner such that groove 50 mirrors groove 114 on the top 142 of the bolt connection base 102 when top retaining plate 16 is in its assembled position.

Clamp 18 can be a tri-clamp or any other sanitary clamp known in the art. Clamp 18 can be circular having any diameter known in the art, wherein common diameters in the art will generally range from about one to about eighteen (1-18) inches. Any type, style or size of clamp 18 as required for the connection of an apparatus or instrument 104 to a pressure vessel known in the art is within the scope of the present invention.

Figure 6:
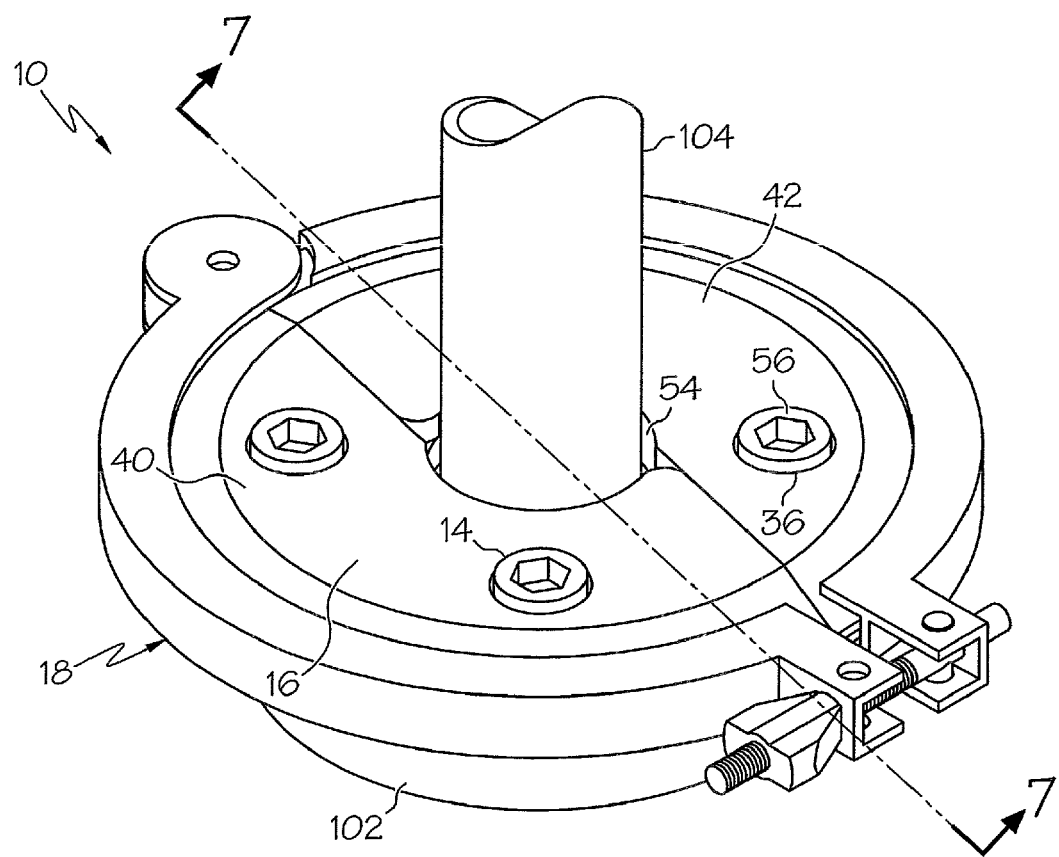
FIG. 6 is a top perspective view of an assembled clamp connection adapter assembly in accordance with one embodiment of the present invention.

FIG. 6 illustrates instrument 104 secured to bolt connection base 102 using the clamp connection adapter assembly 10 of the present invention. This view illustrates the manner in which clamp 18 generally engages the bottom flange plate 12 and the top retaining plate 16. FIG. 6 also illustrates first and second top plate sections 40 and 42 in an overlappingly engaged configuration to substantially duplicate the strength properties of a continuous (i.e., non-split) plate. As shown, each of the apertures 36 of the top retaining plate 16 receive the entirety of the head 56 of threaded fastener 14. Apertures 36 are in a substantially identical pattern to the pattern of threaded bores 144 of bolt connection base 102 shown in FIG. 5. A person of skill in the art will appreciate that any number of apertures 36 in top retaining plate 16 are within the scope of the present invention as the number of apertures 36 will vary upon and generally match the number of threaded bores 144 in bolt connection base 102. It will also be appreciated that top retaining plate 16 can alternatively include counter bores (not shown) directed upwardly through the bottom face of the top retaining plate 16 having a depth sufficient to accommodate the heads 56 of threaded fasteners 14. These counter bores would replace the apertures 36, as best shown in FIG. 5, that extend through the entire thickness of the top retaining plate 16.

Figure 7:
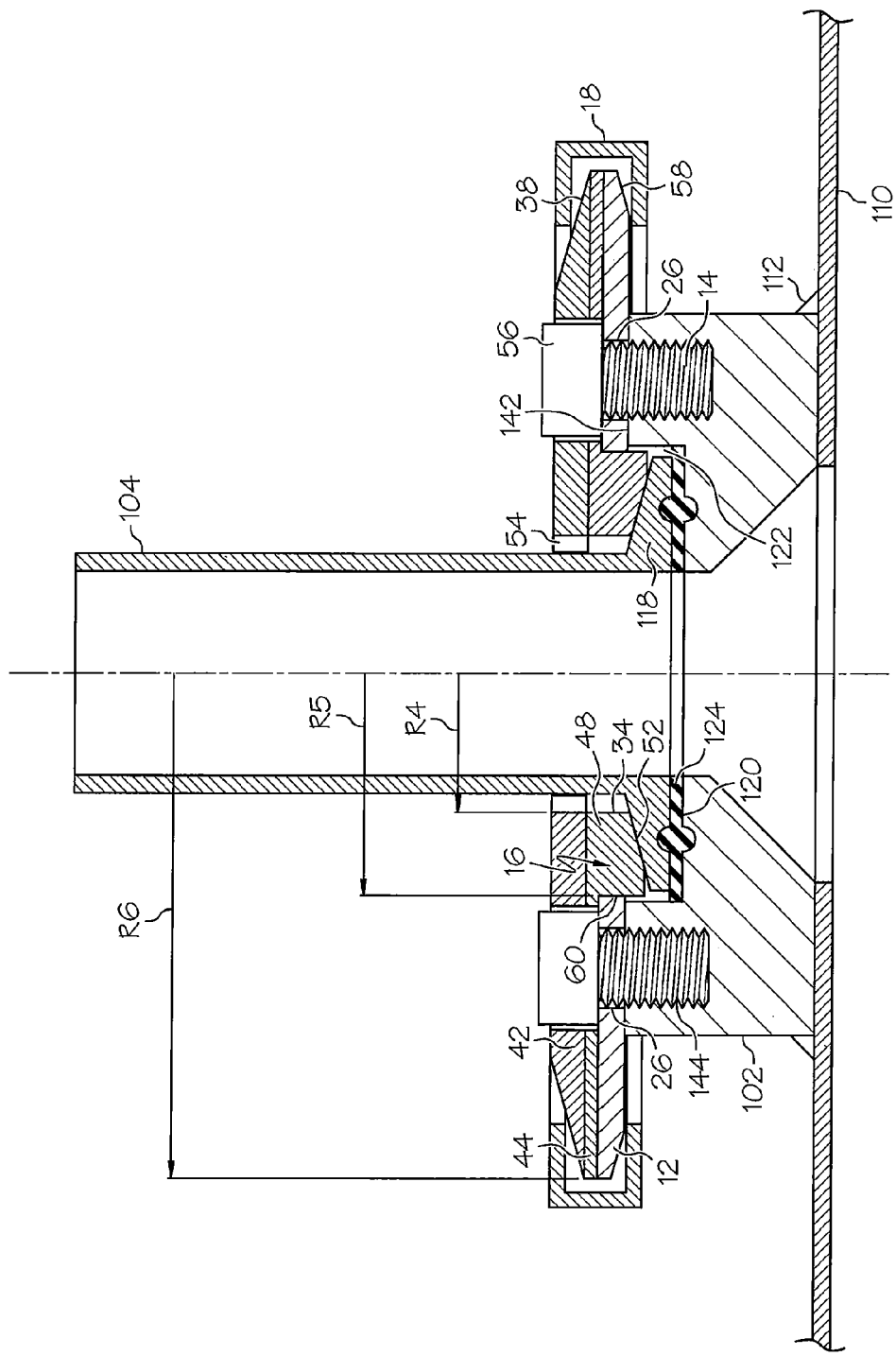
FIG. 7 is a cross sectional view of the assembled clamp connection adapter assembly in FIG. 6 taken along the line 7-7.

FIG. 7 depicts a cross-section of the embodiment shown in FIG. 6. As described above, bolt connection base 102 is coupled to pressure vessel wall 110 with weld 112. Bottom base plate 12 is positioned on the top 142 of bolt connection base 102. As shown, the lower perimeter edge of the bottom base plate 12 is beveled at 58. Threaded fastener 14 passes through bolt hole 26 of bottom flange plate 12 and is received by the threaded bore 144 of bolt connection base 102. Threaded fastener 14 is tightened to couple bottom base plate 12 to bolt connection base 102. Instrument 104 is received within housing 122 and ferrule 118 bears on seat 120. Seal 124 is sandwiched between ferrule 118 and seat 120. In another embodiment, threaded fastener 14 may be replaced with a threaded rod 126 and nut 128.

Top retaining plate 16 is placed over said bottom flange plate 12 wherein said head 56 of threaded fastener 14 nests in aperture 36 of the top retaining plate 16. FIG. 7 illustrates an embodiment wherein top retaining plate 16 has a radius R3 that generally defines outer edge of top retaining plate 16. As shown, the radius R3 of top retaining plate 16 is about equal the radius R1 of bottom flange plate 12. The geometries of bottom flange plate 12 and top retaining plate 16 in this embodiment are substantially identical.

As shown, annular rib 48 is defined by an inside face 34 having a radius R4 and an outside face 60 having a radius R5. Radius R4 is generally configured such that it defines an aperture 54 that is larger than the extents of the portion of instrument 104 passing through top retaining plate 16. Radius R4 is smaller than the area defined by ferrule 118 thereby allowing instrument 104 to be retained in housing 122 of bolt connection base 102. A person of skill in the art will appreciate that any embodiment of top retaining plate 16 consistent with this disclosure is within the scope of the present invention. Radius R5 of outer face 60 is generally sized such that annular rib 48 is received by housing 122 of bolt connection base 102. Annular rib 48 also includes a bearing face 52 wherein an embodiment of annular rib 48 of the present invention includes at least a portion of bearing face 52 having a bevel to match a bevel of ferrule 118 of instrument 104 as shown.

As seen in FIG. 7, clamp 18 engages bevel 58 of bottom flange plate 12 and bevel 38 of top retaining plate 16 and when clamp 18 is tightened through any method known in the art, top retaining plate 16 is forced further into housing 122 and thereby compressing ferrule 118 and seal 124 against seat 120 in housing 122 to seal and secure instrument 104 in bolt connection base 102. In general, bolt connection base 102, and the clamp connection adapter assembly 10 of the present invention are configured to accommodate the connection of any instrument 104 known in the art. Further, clamp connection adapter assembly 10 generally maintains an air-tight and pressure resistant connection of instrument 104 to a pressure vessel that meets the codified requirements.

From the foregoing, it may be seen that the clamp connection adapter assembly of the present invention is particularly well suited for the proposed usages thereof. Furthermore, since certain changes may be made in the above invention without departing from the scope hereof, it is intended that all matter contained in the above description or shown in the accompanying drawing be interpreted as illustrative and not in a limiting sense. It is also to be understood that the following claims are to cover certain generic and specific features described herein.

We claim:

1. A clamp connection adapter assembly configured to convert a bolt compression connection into a clamp compression connection for interchangeably connecting a device to a pressure vessel for connecting a device to a base, said assembly comprising:

a bottom flange plate having a top face, a bottom face, an outer edge defining an outer perimeter, and an inner edge defining a center hole, wherein said bottom face of said bottom flange plate includes a beveled portion proximate said outer edge, and wherein said bottom flange plate includes at least one aperture to removably couple the clamp connection adapter assembly directly to a bolt connection base with at least one fastener;

a top retaining plate having a top face, a bottom face, an outer edge defining an outer perimeter, an inner edge defining a center hole, and an annular rib extending substantially normal to said bottom face proximate said inner edge, wherein said top face of said top retaining plate includes a beveled portion proximate said outer edge, wherein said outer edge of said top retaining plate substantially aligns with said outer edge of said bottom flange plate, and wherein said annular rib is received through said center hole of said bottom flange plate; and a clamp having an effective perimeter and being disposed round the outer edge of both said bottom flange plate and said top retaining plate, said clamp configured to engage the beveled portion of the bottom face of said bottom flange plate and the beveled portion of the top face of said top retaining plate such that tightening the clamp reduces the effective perimeter thereby engaging the beveled portions and wedging said top retaining plate and said bottom flange toward each other and exerting a force on said top plate;

wherein said to retaining plate further comprises a first to plate section and a second top plate section; and wherein said first top plate section and said second top plate section overlappingly engage one another.

2. The clamp connection adapter assembly of claim 1 wherein said bottom flange plate, said top retaining plate and said clamp are circular.

3. The clamp connection adapter assembly of claim 1 wherein said inner annular rib has a bearing face, wherein said bearing face is configured to engage a ferrule of a device.

4. The clamp connection adapter assembly of claim 3 wherein at least a portion of said bearing face includes a bevel that is adapted to be complementary to a bevel of a ferrule of said device.

5. The clamp connection adapter assembly of claim 1 wherein said inner annular rib includes at least one transversely-oriented groove.

6. The clamp connection adapter assembly of claim 1 wherein said first top plate section has a first end and a second end and said second top plate section has a first end and a second end and wherein said first end of said first top plate section is configured to overlap said second end of said second top plate section and said second end of said first top plate section is configured to under-lap said first end of said second top plate section.

7. The clamp connection adapter assembly of claim 1 wherein said bolt connection base is affixed to a pressure vessel.

8. A clamp connection adapter assembly to convert an installed bolt compression connection affixed on a pressure vessel into a compression clamp connection for connecting a device to a pressure vessel, said assembly comprising:
- a base member of a bolt compression connection coupled to a pressure vessel, said base member having a pattern of a plurality of threaded holes, each hole configured to receive a threaded fastener, and said base member including a housing configured to receive a device having a ferrule;
- a bottom flange plate having a top face, a bottom face, an outer edge defining an outer radius, and an inner edge defining an inner aperture having an inner radius, and wherein said bottom face of said bottom flange plate proximate said outer edge is beveled, wherein said bottom flange plate includes a pattern of a plurality of apertures aligning with said pattern of said plurality of threaded holes of said base member and said bottom flange plate being configured to be removably fastened to said base member such that said inner aperture substantially aligns with said housing of said base member;
- a plurality of threaded fasteners configured to be received by said threaded holes of said base member to removably couple said bottom flange plate to said base;
- a top retaining plate having a top face, a bottom face, an outer edge defining an outer diameter, and inner edge defining an aperture and an inner top plate radius, and an inner annular rib extending substantially normal from said bottom face proximate said inner edge, wherein said top face of said top retaining plate is beveled proximate said outer edges, and wherein said outer edge of said top retaining plate substantially aligns with said outer edge of said bottom flange plate;
- wherein said annular rib is received by said inner aperture of said bottom flange plate and said housing of said base member and said annular rib is configured to retain said device in said housing of said base member and wherein said annular rib includes a bearing surface having a bevel that is configured to be complementary and is configured to engage the bevel of said ferrule of said device; and
- a clamp that engages said beveled outer portions of both said bottom face of said bottom flange plate and said top face of said top retaining plate and wherein said clamp is operable to constrict around said outer edges of said bottom flange plate and said top retaining plate thereby wedging said top retaining plate downward to compress said annular rib against said ferrule of said device against said housing of said base member;
- wherein said to retaining plate comprises a first section and a second section that overlappingly engage each other.

9. The clamp connection adapter assembly of claim 8 wherein said first section has a first end and a second end and said second section has a first end and a second end and wherein said first end of said first section is configured to overlap said second end of said second section and said second end of said first section is configured to under-lap said first end of said second section.

10. A clamp connection adapter assembly to convert an installed bolt compression connection affixed on a pressure vessel into a compression clamp connection for connecting a device to the pressure vessel, said assembly comprising:
- a bottom flange plate having a top face, a bottom face, an outer edge defining an outer radius, an inner edge defining an inner aperture having an inner radius, and wherein said bottom face of said bottom flange plate proximate said outer edge is beveled wherein said bottom flange plate includes a plurality of apertures and is configured to be removably fastened to a base member of a bolt compression connection affixed on a pressure vessel, wherein said inner aperture will substantially align with a housing of said base member, and wherein said outer edge of said bottom flange is configured to be outwardly offset from said housing;
- a plurality of threaded fasteners configured for being received by a base member to removably couple said bottom flange plate to said base;
- a top retaining plate having a top face, a bottom face, an outer edge defining an outer diameter, and inner edge defining an aperture and an inner top plate radius, and an inner annular rib extending outwardly from said bottom face proximate said inner edge, wherein said top face of said top retaining plate is beveled proximate said outer edges, and wherein said outer edge of said top retaining plate substantially aligns with said outer edge of said bottom flange plate;
- wherein said annular rib is configured to be received through said inner aperture of said bottom flange plate and into said housing of said base member and wherein said annular rib includes a bearing surface including a beveled portion, wherein the beveled portion is configured to be complementary to and engage a bevel of a ferrule of a device; and
- a circular clamp that engages said beveled outer portions of both said bottom face of said bottom flange plate and said top face of said top retaining plate and wherein said clamp is operable to constrict around said outer edges of said bottom flange plate and said top retaining plate thereby wedging said top retaining plate downward to compress said annular rib against said ferrule of said device within said housing of said base member;
- wherein said to retaining plate comprises a first section and a second section that overlappingly engage each other.

11. The clamp connection adapter assembly of claim 10 wherein said first section has a first end and a second end and said second section has a first end and a second end and wherein said first end of said first section is configured to overlap said second end of said second section and said second end of said first section is configured to under-lap said first end of said second section.

* * * * *